(12) United States Patent  
Klein

(10) Patent No.: US 8,189,766 B1
(45) Date of Patent: May 29, 2012

(54) SYSTEM AND METHOD FOR BLIND SUBBAND ACOUSTIC ECHO CANCELLATION POSTFILTERING

(75) Inventor: David Klein, Los Altos, CA (US)

(73) Assignee: Audience, Inc., Mountain View, CA (US)

( * ) Notice: Subject to any disclaimer, the term of this patent is extended or adjusted under 35 U.S.C. 154(b) by 1083 days.

(21) Appl. No.: 12/004,896

(22) Filed: Dec. 21, 2007

Related U.S. Application Data

(60) Provisional application No. 60/962,198, filed on Jul. 26, 2007.

(51) Int. Cl.
*H04M 9/08* (2006.01)

(52) U.S. Cl. .............. 379/406.07; 379/406.14

(58) Field of Classification Search ............ 379/406.07, 379/406.14
See application file for complete search history.

(56) References Cited

U.S. PATENT DOCUMENTS

| | | |
|---|---|---|
| 3,976,863 A | 8/1976 | Engel |
| 3,978,287 A | 8/1976 | Fletcher et al. |
| 4,137,510 A | 1/1979 | Iwahara |
| 4,433,604 A | 2/1984 | Ott |
| 4,516,259 A | 5/1985 | Yato et al. |
| 4,535,473 A | 8/1985 | Sakata |
| 4,536,844 A | 8/1985 | Lyon |
| 4,581,758 A | 4/1986 | Coker et al. |
| 4,628,529 A | 12/1986 | Borth et al. |
| 4,630,304 A | 12/1986 | Borth et al. |
| 4,649,505 A | 3/1987 | Zinser, Jr. et al. |
| 4,658,426 A | 4/1987 | Chabries et al. |
| 4,674,125 A | 6/1987 | Carlson et al. |
| 4,718,104 A | 1/1988 | Anderson |
| 4,811,404 A | 3/1989 | Vilmur et al. |
| 4,812,996 A | 3/1989 | Stubbs |
| 4,864,620 A | 9/1989 | Bialick |
| 4,920,508 A | 4/1990 | Yassaie et al. |
| 5,027,410 A | 6/1991 | Williamson et al. |
| 5,054,085 A | 10/1991 | Meisel et al. |
| 5,058,419 A | 10/1991 | Nordstrom et al. |
| 5,099,738 A | 3/1992 | Hotz |
| 5,119,711 A | 6/1992 | Bell et al. |
| 5,142,961 A | 9/1992 | Paroutaud |
| 5,150,413 A | 9/1992 | Nakatani et al. |
| 5,175,769 A | 12/1992 | Hejna, Jr. et al. |

(Continued)

FOREIGN PATENT DOCUMENTS

JP          62110349          5/1987

(Continued)

OTHER PUBLICATIONS

International Search Report dated May 29, 2003 in Application No. PCT/US03/04124.

(Continued)

*Primary Examiner* — Alexander Jamal
(74) *Attorney, Agent, or Firm* — Carr & Ferrell LLP

(57) ABSTRACT

Systems and methods for blind subband acoustic echo cancellation postfiltering in a communication device are provided. In exemplary embodiments, an acoustic signal is received via a microphone of the communication device. Acoustic echo cancellation (AEC) is applied to the acoustic signal to obtain an AEC masked signal. Because residual echo may still exist in the AEC masked signal, blind subband AEC postfiltering on the AEC masked signal may be performed to obtain an echo-free acoustic signal. The echo-free signal may then be output.

21 Claims, 6 Drawing Sheets

U.S. PATENT DOCUMENTS

| | | |
|---|---|---|
| 5,187,776 A | 2/1993 | Yanker |
| 5,208,864 A | 5/1993 | Kaneda |
| 5,210,366 A | 5/1993 | Sykes, Jr. |
| 5,224,170 A | 6/1993 | Waite, Jr. |
| 5,230,022 A | 7/1993 | Sakata |
| 5,319,736 A | 6/1994 | Hunt |
| 5,323,459 A | 6/1994 | Hirano |
| 5,341,432 A | 8/1994 | Suzuki et al. |
| 5,381,473 A | 1/1995 | Andrea et al. |
| 5,381,512 A | 1/1995 | Holton et al. |
| 5,400,409 A | 3/1995 | Linhard |
| 5,402,493 A | 3/1995 | Goldstein |
| 5,402,496 A | 3/1995 | Soli et al. |
| 5,471,195 A | 11/1995 | Rickman |
| 5,473,702 A | 12/1995 | Yoshida et al. |
| 5,473,759 A | 12/1995 | Slaney et al. |
| 5,479,564 A | 12/1995 | Vogten et al. |
| 5,502,663 A | 3/1996 | Lyon |
| 5,544,250 A | 8/1996 | Urbanski |
| 5,574,824 A | 11/1996 | Slyh et al. |
| 5,583,784 A | 12/1996 | Kapust et al. |
| 5,587,998 A * | 12/1996 | Velardo et al. ................. 370/289 |
| 5,590,241 A | 12/1996 | Park et al. |
| 5,602,962 A | 2/1997 | Kellermann |
| 5,675,778 A | 10/1997 | Jones |
| 5,682,463 A | 10/1997 | Allen et al. |
| 5,694,474 A | 12/1997 | Ngo et al. |
| 5,706,395 A | 1/1998 | Arslan et al. |
| 5,717,829 A | 2/1998 | Takagi |
| 5,729,612 A | 3/1998 | Abel et al. |
| 5,732,189 A | 3/1998 | Johnston et al. |
| 5,749,064 A | 5/1998 | Pawate et al. |
| 5,757,937 A | 5/1998 | Itoh et al. |
| 5,792,971 A | 8/1998 | Timis et al. |
| 5,796,819 A | 8/1998 | Romesburg |
| 5,806,025 A | 9/1998 | Vis et al. |
| 5,809,463 A | 9/1998 | Gupta et al. |
| 5,825,320 A | 10/1998 | Miyamori et al. |
| 5,839,101 A | 11/1998 | Vahatalo et al. |
| 5,920,840 A | 7/1999 | Satyamurti et al. |
| 5,933,495 A | 8/1999 | Oh |
| 5,943,429 A | 8/1999 | Handel |
| 5,956,674 A | 9/1999 | Smyth et al. |
| 5,974,380 A | 10/1999 | Smyth et al. |
| 5,978,824 A | 11/1999 | Ikeda |
| 5,983,139 A | 11/1999 | Zierhofer |
| 5,990,405 A | 11/1999 | Auten et al. |
| 6,002,776 A | 12/1999 | Bhadkamkar et al. |
| 6,061,456 A | 5/2000 | Andrea et al. |
| 6,072,881 A | 6/2000 | Linder |
| 6,097,820 A | 8/2000 | Turner |
| 6,108,626 A | 8/2000 | Cellario et al. |
| 6,122,610 A | 9/2000 | Isabelle |
| 6,134,524 A | 10/2000 | Peters et al. |
| 6,137,349 A | 10/2000 | Menkhoff et al. |
| 6,140,809 A | 10/2000 | Doi |
| 6,173,255 B1 | 1/2001 | Wilson et al. |
| 6,180,273 B1 | 1/2001 | Okamoto |
| 6,216,103 B1 | 4/2001 | Wu et al. |
| 6,222,927 B1 | 4/2001 | Feng et al. |
| 6,223,090 B1 | 4/2001 | Brungart |
| 6,226,616 B1 | 5/2001 | You et al. |
| 6,263,307 B1 | 7/2001 | Arslan et al. |
| 6,266,633 B1 | 7/2001 | Higgins et al. |
| 6,317,501 B1 | 11/2001 | Matsuo |
| 6,339,758 B1 | 1/2002 | Kanazawa et al. |
| 6,355,869 B1 | 3/2002 | Mitton |
| 6,363,345 B1 | 3/2002 | Marash et al. |
| 6,381,570 B2 | 4/2002 | Li et al. |
| 6,430,295 B1 | 8/2002 | Handel et al. |
| 6,434,417 B1 | 8/2002 | Lovett |
| 6,449,586 B1 | 9/2002 | Hoshuyama |
| 6,469,732 B1 | 10/2002 | Chang et al. |
| 6,487,257 B1 | 11/2002 | Gustafsson et al. |
| 6,496,795 B1 | 12/2002 | Malvar |
| 6,513,004 B1 | 1/2003 | Rigazio et al. |
| 6,516,066 B2 | 2/2003 | Hayashi |
| 6,529,606 B1 | 3/2003 | Jackson, Jr. II et al. |
| 6,549,630 B1 | 4/2003 | Bobisuthi |
| 6,584,203 B2 | 6/2003 | Elko et al. |
| 6,622,030 B1 | 9/2003 | Romesburg et al. |
| 6,717,991 B1 | 4/2004 | Gustafsson et al. |
| 6,718,309 B1 | 4/2004 | Selly |
| 6,738,482 B1 | 5/2004 | Jaber |
| 6,760,450 B2 | 7/2004 | Matsuo |
| 6,785,381 B2 | 8/2004 | Gartner et al. |
| 6,792,118 B2 | 9/2004 | Watts |
| 6,795,558 B2 | 9/2004 | Matsuo |
| 6,798,886 B1 | 9/2004 | Smith et al. |
| 6,810,273 B1 | 10/2004 | Mattila et al. |
| 6,882,736 B2 | 4/2005 | Dickel et al. |
| 6,915,264 B2 | 7/2005 | Baumgarte |
| 6,917,688 B2 | 7/2005 | Yu et al. |
| 6,944,510 B1 | 9/2005 | Ballesty et al. |
| 6,978,159 B2 | 12/2005 | Feng et al. |
| 6,982,377 B2 | 1/2006 | Sakurai et al. |
| 6,999,582 B1 | 2/2006 | Popovic et al. |
| 7,016,507 B1 | 3/2006 | Brennan |
| 7,020,605 B2 | 3/2006 | Gao |
| 7,031,478 B2 | 4/2006 | Belt et al. |
| 7,054,452 B2 | 5/2006 | Ukita |
| 7,065,485 B1 | 6/2006 | Chong-White et al. |
| 7,076,315 B1 | 7/2006 | Watts |
| 7,092,529 B2 | 8/2006 | Yu et al. |
| 7,092,882 B2 | 8/2006 | Arrowood et al. |
| 7,099,821 B2 | 8/2006 | Visser et al. |
| 7,142,677 B2 | 11/2006 | Gonopolskiy et al. |
| 7,146,316 B2 | 12/2006 | Alves |
| 7,155,019 B2 | 12/2006 | Hou |
| 7,164,620 B2 | 1/2007 | Hoshuyama |
| 7,171,008 B2 | 1/2007 | Elko |
| 7,171,246 B2 | 1/2007 | Mattila et al. |
| 7,174,022 B1 | 2/2007 | Zhang et al. |
| 7,206,418 B2 | 4/2007 | Yang et al. |
| 7,209,567 B1 | 4/2007 | Kozel et al. |
| 7,225,001 B1 | 5/2007 | Eriksson et al. |
| 7,242,762 B2 | 7/2007 | He et al. |
| 7,246,058 B2 | 7/2007 | Burnett |
| 7,254,242 B2 | 8/2007 | Ise et al. |
| 7,359,520 B2 | 4/2008 | Brennan et al. |
| 7,412,379 B2 | 8/2008 | Taori et al. |
| 7,433,907 B2 | 10/2008 | Nagai et al. |
| 7,555,434 B2 | 6/2009 | Nomura et al. |
| 7,949,522 B2 | 5/2011 | Hetherington et al. |
| 2001/0016020 A1 | 8/2001 | Gustafsson et al. |
| 2001/0031053 A1 | 10/2001 | Feng et al. |
| 2002/0002455 A1 | 1/2002 | Accardi et al. |
| 2002/0009203 A1 | 1/2002 | Erten |
| 2002/0041693 A1 | 4/2002 | Matsuo |
| 2002/0080980 A1 | 6/2002 | Matsuo |
| 2002/0106092 A1 | 8/2002 | Matsuo |
| 2002/0116187 A1 | 8/2002 | Erten |
| 2002/0133334 A1 | 9/2002 | Coorman et al. |
| 2002/0147595 A1 | 10/2002 | Baumgarte |
| 2002/0184013 A1 * | 12/2002 | Walker .......................... 704/226 |
| 2003/0014248 A1 | 1/2003 | Vetter |
| 2003/0026437 A1 | 2/2003 | Janse et al. |
| 2003/0033140 A1 | 2/2003 | Taori et al. |
| 2003/0039369 A1 | 2/2003 | Bullen |
| 2003/0040908 A1 | 2/2003 | Yang et al. |
| 2003/0061032 A1 | 3/2003 | Gonopolskiy |
| 2003/0063759 A1 | 4/2003 | Brennan et al. |
| 2003/0072382 A1 | 4/2003 | Raleigh et al. |
| 2003/0072460 A1 | 4/2003 | Gonopolskiy et al. |
| 2003/0095667 A1 | 5/2003 | Watts |
| 2003/0099345 A1 | 5/2003 | Gartner et al. |
| 2003/0101048 A1 | 5/2003 | Liu |
| 2003/0103632 A1 | 6/2003 | Goubran et al. |
| 2003/0128851 A1 | 7/2003 | Furuta |
| 2003/0138116 A1 | 7/2003 | Jones et al. |
| 2003/0147538 A1 | 8/2003 | Elko |
| 2003/0169891 A1 | 9/2003 | Ryan et al. |
| 2003/0228023 A1 | 12/2003 | Burnett et al. |
| 2004/0013276 A1 | 1/2004 | Ellis et al. |
| 2004/0047464 A1 | 3/2004 | Yu et al. |
| 2004/0057574 A1 | 3/2004 | Faller |
| 2004/0078199 A1 | 4/2004 | Kremer et al. |

| | | | |
|---|---|---|---|
| 2004/0131178 A1 | 7/2004 | Shahaf et al. | |
| 2004/0133421 A1 | 7/2004 | Burnett et al. | |
| 2004/0165736 A1 | 8/2004 | Hetherington et al. | |
| 2004/0196989 A1 | 10/2004 | Friedman et al. | |
| 2004/0263636 A1 | 12/2004 | Cutler et al. | |
| 2005/0025263 A1 | 2/2005 | Wu | |
| 2005/0027520 A1 | 2/2005 | Mattila et al. | |
| 2005/0049864 A1 | 3/2005 | Kaltenmeier et al. | |
| 2005/0060142 A1 | 3/2005 | Visser et al. | |
| 2005/0152559 A1 | 7/2005 | Gierl et al. | |
| 2005/0185813 A1 | 8/2005 | Sinclair et al. | |
| 2005/0213778 A1 | 9/2005 | Buck et al. | |
| 2005/0216259 A1 | 9/2005 | Watts | |
| 2005/0228518 A1 | 10/2005 | Watts | |
| 2005/0276423 A1 | 12/2005 | Aubauer et al. | |
| 2005/0288923 A1 | 12/2005 | Kok | |
| 2006/0072768 A1 | 4/2006 | Schwartz et al. | |
| 2006/0074646 A1 | 4/2006 | Alves et al. | |
| 2006/0098809 A1 | 5/2006 | Nongpiur et al. | |
| 2006/0120537 A1 | 6/2006 | Burnett et al. | |
| 2006/0133621 A1 | 6/2006 | Chen et al. | |
| 2006/0149535 A1 | 7/2006 | Choi et al. | |
| 2006/0184363 A1 | 8/2006 | McCree et al. | |
| 2006/0198542 A1 | 9/2006 | Benjelloun Touimi et al. | |
| 2006/0222184 A1 | 10/2006 | Buck et al. | |
| 2007/0021958 A1 | 1/2007 | Visser et al. | |
| 2007/0027685 A1 | 2/2007 | Arakawa et al. | |
| 2007/0033020 A1 | 2/2007 | (Kelleher) Francois et al. | |
| 2007/0067166 A1 | 3/2007 | Pan et al. | |
| 2007/0078649 A1 | 4/2007 | Hetherington et al. | |
| 2007/0094031 A1 | 4/2007 | Chen | |
| 2007/0100612 A1 | 5/2007 | Ekstrand et al. | |
| 2007/0116300 A1 | 5/2007 | Chen | |
| 2007/0150268 A1 | 6/2007 | Acero et al. | |
| 2007/0154031 A1 | 7/2007 | Avendano et al. | |
| 2007/0165879 A1 | 7/2007 | Deng et al. | |
| 2007/0195968 A1 | 8/2007 | Jaber | |
| 2007/0230712 A1 | 10/2007 | Belt et al. | |
| 2007/0276656 A1 | 11/2007 | Solbach et al. | |
| 2008/0019548 A1 | 1/2008 | Avendano | |
| 2008/0033723 A1 | 2/2008 | Jang et al. | |
| 2008/0140391 A1 | 6/2008 | Yen et al. | |
| 2008/0201138 A1 | 8/2008 | Visser et al. | |
| 2008/0228478 A1 | 9/2008 | Hetherington et al. | |
| 2008/0260175 A1 | 10/2008 | Elko | |
| 2009/0012783 A1 | 1/2009 | Klein | |
| 2009/0012786 A1 | 1/2009 | Zhang et al. | |
| 2009/0129610 A1 | 5/2009 | Kim et al. | |
| 2009/0220107 A1 | 9/2009 | Every et al. | |
| 2009/0238373 A1 | 9/2009 | Klein | |
| 2009/0253418 A1 | 10/2009 | Makinen | |
| 2009/0271187 A1 | 10/2009 | Yen et al. | |
| 2009/0323982 A1 | 12/2009 | Solbach et al. | |
| 2010/0094643 A1 | 4/2010 | Avendano et al. | |
| 2010/0278352 A1 | 11/2010 | Petit et al. | |
| 2011/0178800 A1 | 7/2011 | Watts | |

FOREIGN PATENT DOCUMENTS

| | | |
|---|---|---|
| JP | 4184400 | 7/1992 |
| JP | 5053587 | 3/1993 |
| JP | 05-172865 | 7/1993 |
| JP | 6269083 | 9/1994 |
| JP | 10-313497 | 11/1998 |
| JP | 11-249693 | 9/1999 |
| JP | 2004053895 | 2/2004 |
| JP | 2004531767 | 10/2004 |
| JP | 2004533155 | 10/2004 |
| JP | 2005110127 | 4/2005 |
| JP | 2005148274 | 6/2005 |
| JP | 2005518118 | 6/2005 |
| JP | 2005195955 | 7/2005 |
| WO | 01/74118 | 10/2001 |
| WO | 02080362 | 10/2002 |
| WO | 02103676 | 12/2002 |
| WO | 03/043374 | 5/2003 |
| WO | 03/069499 | 8/2003 |
| WO | 03069499 | 8/2003 |
| WO | 2004/010415 | 1/2004 |
| WO | 2007/081916 | 7/2007 |
| WO | 2007/140003 | 12/2007 |
| WO | 2010/005493 | 1/2010 |

OTHER PUBLICATIONS

International Search Report and Written Opinion dated Oct. 19, 2007 in Application No. PCT/US07/00463.

International Search Report and Written Opinion dated Apr. 9, 2008 in Application No. PCT/US07/21654.

International Search Report and Written Opinion dated Sep. 16, 2008 in Application No. PCT/US07/12628.

International Search Report and Written Opinion dated Oct. 1, 2008 in Application No. PCT/US08/08249.

International Search Report and Written Opinion dated May 11, 2009 in Application No. PCT/US09/01667.

International Search Report and Written Opinion dated Aug. 27, 2009 in Application No. PCT/US09/03813.

International Search Report and Written Opinion dated May 20, 2010 in Application No. PCT/US09/06754.

Fast Cochlea Transform, US Trademark Reg. No. 2,875,755 (Aug. 17, 2004).

Dahl, Mattias et al., "Acoustic Echo and Noise Cancelling Using Microphone Arrays", International Symposium on Signal Processing and its Applications, ISSPA, Gold coast, Australia, Aug. 25-30, 1996, pp. 379-382.

Demol, M. et al. "Efficient Non-Uniform Time-Scaling of Speech With WSOLA for CALL Applications", Proceedings of InSTIL/ICALL2004—NLP and Speech Technologies in Advanced Language Learning Systems—Venice Jun. 17-19, 2004.

Laroche, Jean. "Time and Pitch Scale Modification of Audio Signals", in "Applications of Digital Signal Processing to Audio and Acoustics", The Kluwer International Series in Engineering and Computer Science, vol. 437, pp. 279-309, 2002.

Moulines, Eric et al., "Non-Parametric Techniques for Pitch-Scale and Time-Scale Modification of Speech", Speech Communication, vol. 16, pp. 175-205, 1995.

Verhelst, Werner, "Overlap-Add Methods for Time-Scaling of Speech", Speech Communication vol. 30, pp. 207-221, 2000.

Allen, Jont B. "Short Term Spectral Analysis, Synthesis, and Modification by Discrete Fourier Transform", IEEE Transactions on Acoustics, Speech, and Signal Processing. vol. ASSP-25, No. 3, Jun. 1977. pp. 235-238.

Allen, Jont B. et al. "A Unified Approach to Short-Time Fourier Analysis and Synthesis", Proceedings of the IEEE. vol. 65, No. 11, Nov. 1977. pp. 1558-1564.

Avendano, Carlos, "Frequency-Domain Source Identification and Manipulation in Stereo Mixes for Enhancement, Suppression and Re-Panning Applications," 2003 IEEE Workshop on Application of Signal Processing to Audio and Acoustics, Oct. 19-22, pp. 55-58, New Paltz, New York, USA.

Boll, Steven F. "Suppression of Acoustic Noise in Speech using Spectral Subtraction", IEEE Transactions on Acoustics, Speech and Signal Processing, vol. ASSP-27, No. 2, Apr. 1979, pp. 113-120.

Boll, Steven F. et al. "Suppression of Acoustic Noise in Speech Using Two Microphone Adaptive Noise Cancellation", IEEE Transactions on Acoustic, Speech, and Signal Processing, vol. ASSP-28, No. 6, Dec. 1980, pp. 752-753.

Boll, Steven F. "Suppression of Acoustic Noise in Speech Using Spectral Subtraction", Dept. of Computer Science, University of Utah Salt Lake City, Utah, Apr. 1979, pp. 18-19.

Chen, Jingdong et al. "New Insights into the Noise Reduction Wiener Filter", IEEE Transactions on Audio, Speech, and Language Processing. vol. 14, No. 4, Jul. 2006, pp. 1218-1234.

Cohen, Israel et al. "Microphone Array Post-Filtering for Non-Stationary Noise Suppression", IEEE International Conference on Acoustics, Speech, and Signal Processing, May 2002, pp. 1-4.

Cohen, Israel, "Multichannel Post-Filtering in Nonstationary Noise Environments", IEEE Transactions on Signal Processing, vol. 52, No. 5, May 2004, pp. 1149-1160.

Dahl, Mattias et al., "Simultaneous Echo Cancellation and Car Noise Suppression Employing a Microphone Array", 1997 IEEE International Conference on Acoustics, Speech, and Signal Processing, Apr. 21-24, pp. 239-242.

Elko, Gary W., "Chapter 2: Differential Microphone Arrays", "Audio Signal Processing for Next-Generation Multimedia Communication Systems", 2004, pp. 12-65, Kluwer Academic Publishers, Norwell, Massachusetts, USA.

"ENT 172." Instructional Module. Prince George's Community College Department of Engineering Technology. Accessed: Oct. 15, 2011. Subsection: "Polar and Rectangular Notation". <http://academic.ppgcc.edu/ent/ent172__instr__mod.html>.

Fuchs, Martin et al. "Noise Suppression for Automotive Applications Based on Directional Information", 2004 IEEE International Conference on Acoustics, Speech, and Signal Processing, May 17-21, pp. 237-240.

Fulghum, D. P. et al., "LPC Voice Digitizer with Background Noise Suppression", 1979 IEEE International Conference on Acoustics, Speech, and Signal Processing, pp. 220-223.

Goubran, R.A. "Acoustic Noise Suppression Using Regression Adaptive Filtering", 1990 IEEE 40th Vehicular Technology Conference, May 6-9, pp. 48-53.

Graupe, Daniel et al., "Blind Adaptive Filtering of Speech from Noise of Unknown Spectrum Using a Virtual Feedback Configuration", IEEE Transactions on Speech and Audio Processing, Mar. 2000, vol. 8, No. 2, pp. 146-158.

Haykin, Simon et al. "Appendix A.2 Complex Numbers." Signals and Systems. 2nd Ed. 2003. p. 764.

Hermansky, Hynek "Should Recognizers Have Ears?", In Proc. ESCA Tutorial and Research Workshop on Robust Speech Recognition for Unknown Communication Channels, pp. 1-10, France 1997.

Hohmann, V. "Frequency Analysis and Synthesis Using a Gammatone Filterbank", ACTA Acustica United with Acustica, 2002, vol. 88, pp. 433-442.

Jeffress, Lloyd A. et al. "A Place Theory of Sound Localization," Journal of Comparative and Physiological Psychology, 1948, vol. 41, p. 35-39.

Jeong, Hyuk et al., "Implementation of a New Algorithm Using the STFT with Variable Frequency Resolution for the Time-Frequency Auditory Model", J. Audio Eng. Soc., Apr. 1999, vol. 47, No. 4., pp. 240-251.

Kates, James M. "A Time-Domain Digital Cochlear Model", IEEE Transactions on Signal Processing, Dec. 1991, vol. 39, No. 12, pp. 2573-2592.

Lazzaro, John et al., "A Silicon Model of Auditory Localization," Neural Computation Spring 1989, vol. 1, pp. 47-57, Massachusetts Institute of Technology.

Lippmann, Richard P. "Speech Recognition by Machines and Humans", Speech Communication, Jul. 1997, vol. 22, No. 1, pp. 1-15.

Liu, Chen et al. "A Two-Microphone Dual Delay-Line Approach for Extraction of a Speech Sound in the Presence of Multiple Interferers", Journal of the Acoustical Society of America, vol. 110, No. 6, Dec. 2001, pp. 3218-3231.

Martin, Rainer et al. "Combined Acoustic Echo Cancellation, Dereverberation and Noise Reduction: A two Microphone Approach", Annales des Telecommunications/Annals of Telecommunications. vol. 49, No. 7-8, Jul.-Aug. 1994, pp. 429-438.

Martin, Rainer "Spectral Subtraction Based on Minimum Statistics", in Proceedings Europe. Signal Processing Conf., 1994, pp. 1182-1185.

Mitra, Sanjit K. Digital Signal Processing: a Computer-based Approach. 2nd Ed. 2001. pp. 131-133.

Mizumachi, Mitsunori et al. "Noise Reduction by Paired-Microphones Using Spectral Subtraction", 1998 IEEE International Conference on Acoustics, Speech and Signal Processing, May 12-15. pp. 1001-1004.

Moonen, Marc et al. "Multi-Microphone Signal Enhancement Techniques for Noise Suppression and Dereverbration," http://www.esat.kuleuven.ac.be/sista/yearreport97//node37.html, accessed on Apr. 21, 1998.

Watts, Lloyd Narrative of Prior Disclosure of Audio Display on Feb. 15, 2000 and May 31, 2000.

Cosi, Piero et al. (1996), "Lyon's Auditory Model Inversion: a Tool for Sound Separation and Speech Enhancement," Proceedings of ESCA Workshop on 'The Auditory Basis of Speech Perception,' Keele University, Keele (UK), Jul. 15-19, 1996, pp. 194-197.

Parra, Lucas et al. "Convolutive Blind Separation of Non-Stationary Sources", IEEE Transactions on Speech and Audio Processing. vol. 8, No. 3, May 2008, pp. 320-327.

Rabiner, Lawrence R. et al. "Digital Processing of Speech Signals", (Prentice-Hall Series in Signal Processing). Upper Saddle River, NJ: Prentice Hall, 1978.

Weiss, Ron et al., "Estimating Single-Channel Source Separation Masks: Revelance Vector Machine Classifiers vs. Pitch-Based Masking", Workshop on Statistical and Perceptual Audio Processing, 2006.

Schimmel, Steven et al., "Coherent Envelope Detection for Modulation Filtering of Speech," 2005 IEEE International Conference on Acoustics, Speech, and Signal Processing, vol. 1, No. 7, pp. 221-224.

Slaney, Malcom, "Lyon's Cochlear Model", Advanced Technology Group, Apple Technical Report #13, Apple Computer, Inc., 1988, pp. 1-79.

Slaney, Malcom, et al. "Auditory Model Inversion for Sound Separation," 1994 IEEE International Conference on Acoustics, Speech and Signal Processing, Apr. 19-22, vol. 2, pp. 77-80.

Slaney, Malcom. "An Introduction to Auditory Model Inversion", Interval Technical Report IRC 1994-014, http://coweb.ecn.purdue.edu/~maclom/interval/1994-014/, Sep. 1994, accessed on Jul. 6, 2010.

Solbach, Ludger "An Architecture for Robust Partial Tracking and Onset Localization in Single Channel Audio Signal Mixes", Technical University Hamburg-Harburg, 1998.

Stahl, V. et al., "Quantile Based Noise Estimation for Spectral Subtraction and Wiener Filtering," 2000 IEEE International Conference on Acoustics, Speech, and Signal Processing, Jun. 5-9, vol. 3, pp. 1875-1878.

Syntrillium Software Corporation, "Cool Edit User's Manual", 1996, pp. 1-74.

Tashev, Ivan et al. "Microphone Array for Headset with Spatial Noise Suppressor", http://research.microsoft.com/users/ivantash/Documents/Tashev__MAforHeadset__HSCMA__05.pdf. (4 pages).

Tchorz, Jurgen et al., "SNR Estimation Based on Amplitude Modulation Analysis with Applications to Noise Suppression", IEEE Transactions on Speech and Audio Processing, vol. 11, No. 3, May 2003, pp. 184-192.

Valin, Jean-Marc et al. "Enhanced Robot Audition Based on Microphone Array Source Separation with Post-Filter", Proceedings of 2004 IEEE/RSJ International Conference on Intelligent Robots and Systems, Sep. 28-Oct. 2, 2004, Sendai, Japan. pp. 2123-2128.

Watts, Lloyd, "Robust Hearing Systems for Intelligent Machines," Applied Neurosystems Corporation, 2001, pp. 1-5.

Widrow, B. et al., "Adaptive Antenna Systems," Proceedings of the IEEE, vol. 55, No. 12, pp. 2143-2159, Dec. 1967.

Yoo, Heejong et al., "Continuous-Time Audio Noise Suppression and Real-Time Implementation", 2002 IEEE International Conference on Acoustics, Speech, and Signal Processing, May 13-17, pp. IV3980-IV3983.

International Search Report dated Jun. 8, 2001 in Application No. PCT/US01/08372.

International Search Report dated Apr. 3, 2003 in Application No. PCT/US02/36946.

* cited by examiner

SYSTEM AND METHOD FOR BLIND SUBBAND ACOUSTIC ECHO CANCELLATION POSTFILTERING

CROSS-REFERENCE TO RELATED APPLICATION

The present application claims the benefit of U.S. Provisional Patent Application No. 60/962,198, filed Jul. 26, 2007, entitled "2-Channel and 3-Channel Acoustic Echo Cancellation," which is hereby incorporated by reference.

The present application is related to U.S. patent application Ser. No. 12/004,899 filed Dec. 21, 2007 and entitled "System and Method for 2-Channel and 3-Channel Acoustic Echo Cancellation," which claims the benefit of U.S. Provisional Patent Application No. 60/903,066, filed Feb. 23, 2007, entitled "Null Processing for AEC," both of which are herein incorporated by reference.

The present application is also related to U.S. patent application Ser. No. 11/825,563 filed Jul. 6, 2007 and entitled "System and Method for Adaptive Intelligent Noise Suppression," U.S. patent application Ser. No. 11/343,524, filed Jan. 30, 2006 and entitled "System and Method for Utilizing Inter-Microphone Level Differences for Speech Enhancement," and U.S. patent application Ser. No. 11/699,732 filed Jan. 29, 2007 and entitled "System And Method For Utilizing Omni-Directional Microphones For Speech Enhancement," all of which are herein incorporated by reference.

BACKGROUND OF THE INVENTION

1. Field of Invention

The present invention relates generally to audio processing and more particularly to post acoustic echo cancellation filtering in an audio system.

2. Description of Related Art

Conventionally, when audio from a far-end environment is presented through a loudspeaker of a communication device, a far-end audio signal may be picked up by microphones or other audio sensors of the communication device. As such, the far-end audio signal may be sent back to the far-end environment resulting in an echo to a far-end listener. In order to reduce or eliminate this echo, an acoustic echo canceller may be utilized.

However, there may be some residual echo remaining after acoustic echo cancellation is performed. This is a result of the fact that there is some limit to the amount of echo that can be subtracted out from an acoustic signal picked up by the microphones or audio sensors. Typically, what is left is still audible. In order to reduce or eliminate the residual echo, a non-linear processing or postfiltering process may be utilized after the acoustic echo cancellation operation. Conventionally, these non-linear or postfiltering processes require knowledge of the far-end audio signal that is leaking back through the microphones or audio sensors.

SUMMARY OF THE INVENTION

Embodiments of the present invention overcome or substantially alleviate prior problems associated with reducing residual echo post acoustic echo cancellation processing. In exemplary embodiments, an acoustic signal is received by a microphone of the communication device.

Because a loudspeaker may provide audio that may be picked up by the microphone, the acoustic signals may include loudspeaker leakage. As such, acoustic echo cancellation (AEC) is applied to the acoustic signal to obtain an AEC masked signal.

Because residual echo may still exist in the AEC masked signal, blind subband AEC postfiltering on the AEC masked signal may be performed to obtain an echo-free acoustic signal. In exemplary embodiments, the AEC masked signal is processed through a noise suppression system and a blind subband AEC postfilter (BSAP) system. The noise suppression system may provide a noise estimate for each subband of the AEC masked signal which may be utilized by the BSAP system.

The exemplary BSAP system is configured to render the residual echo inaudible without knowledge of the far-end signal. In one embodiment, the BSAP system may comprise an echo dominance estimate module configured to determine an echo dominance estimate for each subband of the acoustic signal. The echo dominance estimate is then provided to an echo-free noise estimate module, which is configured to determine an echo-free noise estimate for each subband of the acoustic signal. A combined echo/noise mask generator may then generate a combined echo/noise mask for each subband of the acoustic signal based on the echo dominance estimate, echo-free noise estimate, and a noise suppression mask gain.

The combined echo/noise mask is then applied to each subband of the acoustic signal and the echo-free signal may then be output.

DESCRIPTION OF EXEMPLARY EMBODIMENTS

The present invention provides exemplary systems and methods for providing acoustic echo cancellation (AEC) postfiltering. Exemplary embodiments perform the AEC postfiltering based on frequency subbands and without knowledge of a far-end signal. As such, the AEC postfiltering may be referred to as blind subband AEC postfiltering.

Exemplary embodiments are configured to reduce and/or minimize effects of loudspeaker signal leakage back to microphones in a way that the far-end environment does not perceive an echo. Embodiments of the present invention can operate after AEC filtering. In one example, an AEC filter is employed that does not require knowledge of a far-end signal being played through a loudspeaker (e.g., strength and magnitude), only a direction the far-end signal is coming from. Those skilled in the art will appreciate that various embodiments are not tied to any AEC filtration system or any AEC algorithm. While the following description will focus on a two microphone system, alternative embodiments may utilize any number of microphones in a microphone array or a single microphone.

Embodiments of the present invention may be practiced on any device that is configured to receive audio such as, but not limited to, cellular phones, phone handsets, headsets, and conferencing systems. While some embodiments of the present invention will be described in reference to operation on a speakerphone, the present invention may be practiced on any audio device.

Figure 1:
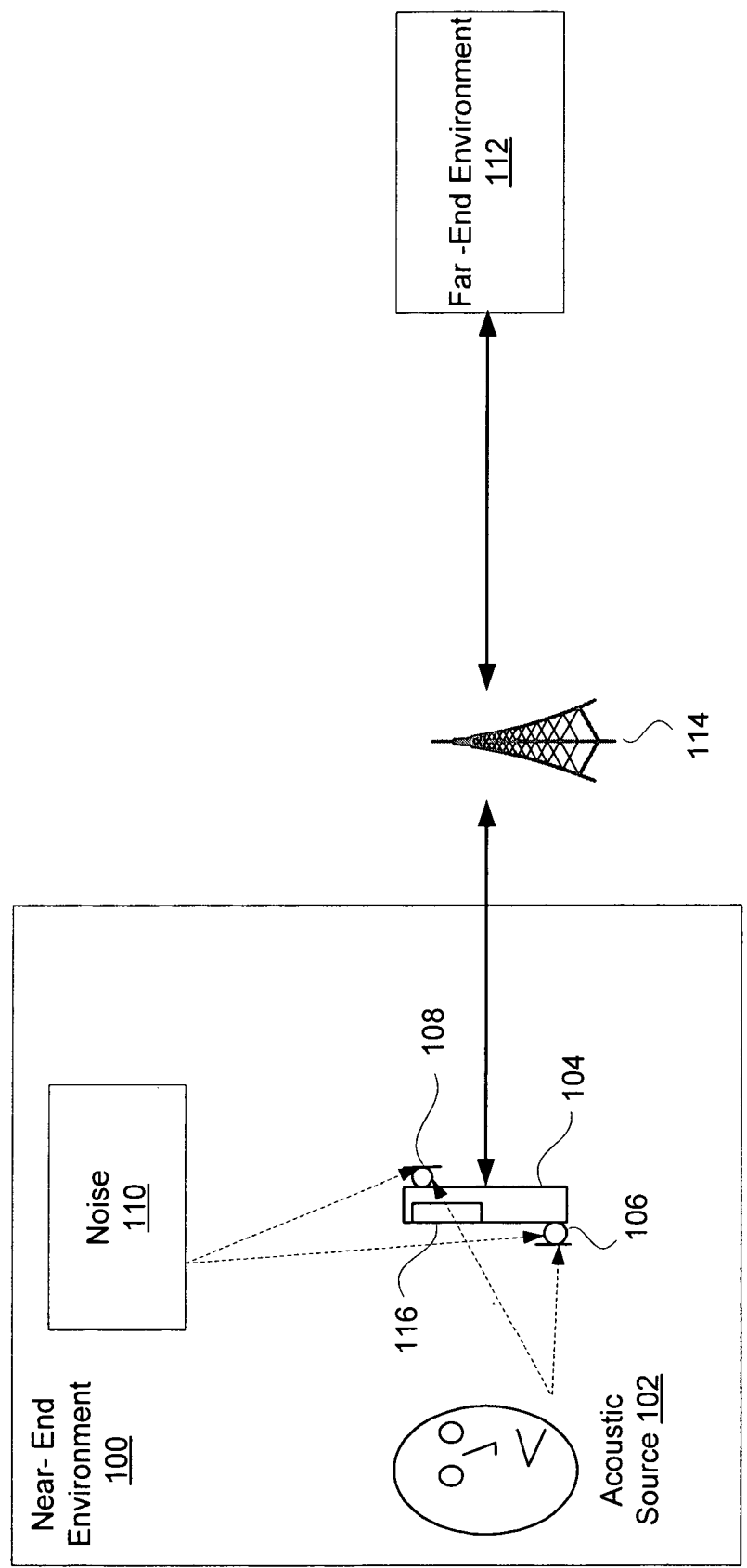
FIG. 1 is an environment in which embodiments of the present invention may be practiced.

Referring to FIG. 1, an environment in which embodiments of the present invention may be practiced is shown. A user in a near-end environment 100 acts as an acoustic source 102 to a communication device 104. The exemplary communication device 104 comprises two microphones: a primary microphone 106 relative to the acoustic source 102 and a secondary microphone 108 located a distance away from the primary microphone 106. In some embodiments, the primary and secondary microphones 106 and 108 comprise omni-directional microphones. It should also be noted that embodiments of the present invention may be applied in both wideband and narrowband applications so long as a distance between the primary and secondary microphones 106 and 108 is not larger than a speed of sound divided by a sample rate.

While the microphones 106 and 108 receive sound (i.e., acoustic signals) from the acoustic source 102, the microphones 106 and 108 also pick up noise 110 in the near-end environment 100. Although the noise 110 is shown coming from a single location in FIG. 1, the noise 110 may comprise any sounds from one or more locations different than the acoustic source 102, and may include reverberations, echoes, and distractors. The noise 110 may be stationary, non-stationary, and/or a combination of both stationary and non-stationary noise.

Some embodiments of the present invention utilize level differences (e.g., energy differences) between the acoustic signals received by the two microphones 106 and 108. Because the primary microphone 106 is much closer to the acoustic source 102 than the secondary microphone 108, the intensity level is higher for the primary microphone 106 resulting in a larger energy level during a speech/voice segment, for example.

The level difference may then be used to discriminate speech and noise in the time-frequency domain. Further embodiments may use a combination of energy level differences and time delays to discriminate speech. Based on binaural cue decoding, speech signal extraction or speech enhancement may be performed.

An acoustic signal comprising speech from a far-end environment 112 may be received via a communication network 114 by the communication device 104. The received acoustic signal may then be provided to the near-end environment 100 via a loudspeaker 116 associated with the communication device 104. The audio output through the loudspeaker 116 may leak back into (i.e., be picked up by) the primary and/or secondary microphone 106 and 108. This leakage may result in an echo at the far-end environment 112.

Figure 2:
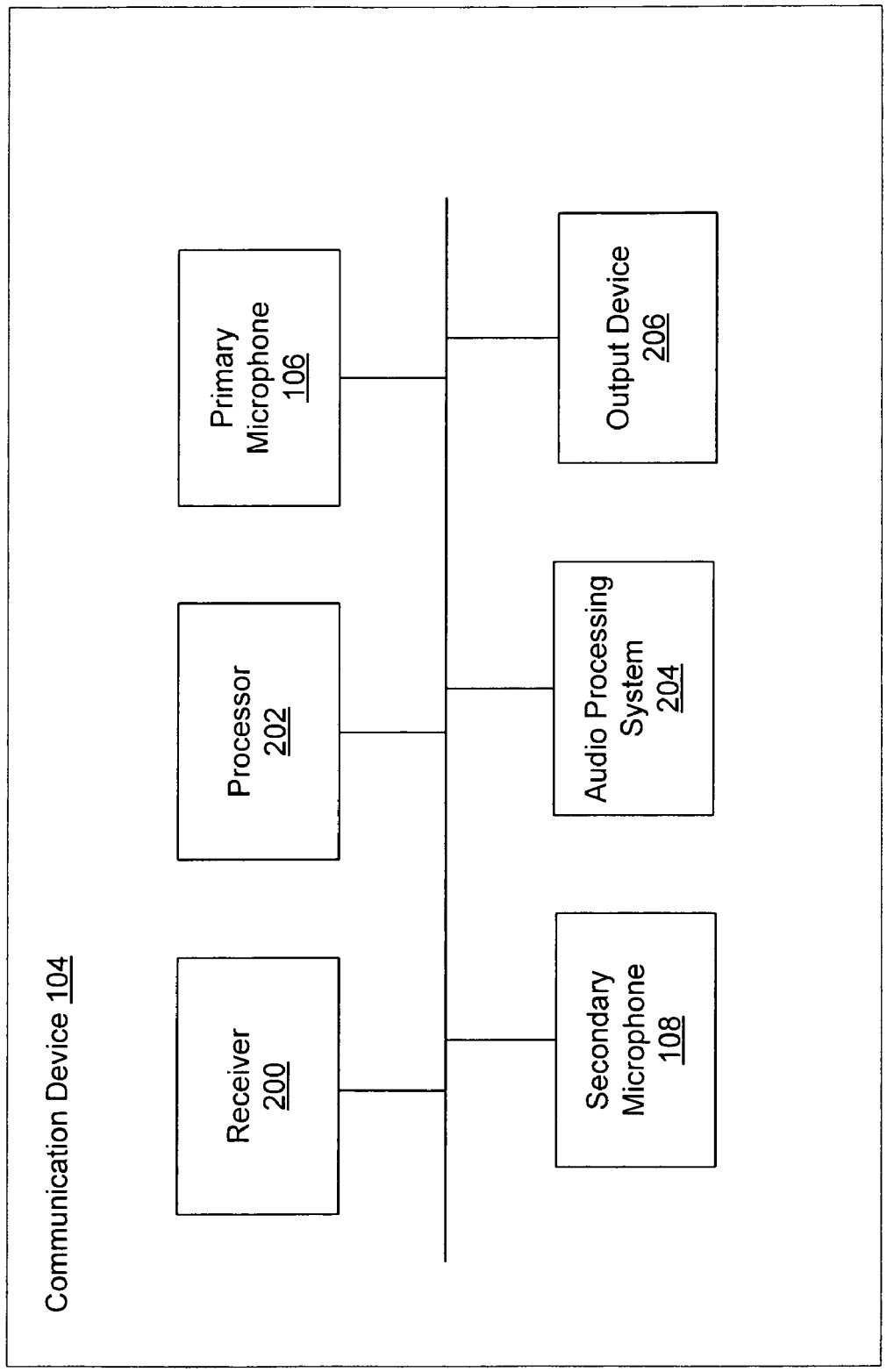
FIG. 2 is a block diagram of an exemplary communication device implementing embodiments of the present invention.

Referring now to FIG. 2, the exemplary communication device 104 is shown in more detail. In exemplary embodiments, the communication device 104 is an audio receiving device that comprises a receiver 200, a processor 202, the primary microphone 106, the secondary microphone 108, an audio processing system 204, and an output device 206. The communication device 104 may comprise more or less components necessary for communication device 104 operations.

The exemplary receiver 200 is an acoustic sensor configured to receive a far-end signal from the network 114. In some embodiments, the receiver 200 may comprise an antenna device. The received far-end signal may then be forwarded to the audio processing system 204.

The audio processing system 204 is configured to receive the acoustic signals from the acoustic source 102 via the primary and secondary microphones 106 and 108 (e.g., primary and secondary acoustic sensors) and process the acoustic signals. As previously discussed, the primary and secondary microphones 106 and 108, respectively, are spaced a distance apart in order to allow for an energy level differences between them. After reception by the microphones 106 and 108, the acoustic signals may be converted into electric signals (i.e., a primary electric signal and a secondary electric signal). The electric signals may themselves be converted by an analog-to-digital converter (not shown) into digital signals for processing in accordance with some embodiments. In order to differentiate the acoustic signals, the acoustic signal received by the primary microphone 106 is herein referred to as the primary acoustic signal, while the acoustic signal received by the secondary microphone 108 is herein referred to as the secondary acoustic signal. It should be noted that embodiments of the present invention may be practiced utilizing a plurality of microphones.

The output device 206 is any device which provides an audio output to a listener (e.g., the acoustic source 102). For example, the output device 206 may comprise the loudspeaker 116, an earpiece of a headset, or handset on the communication device 104.

Figure 3:
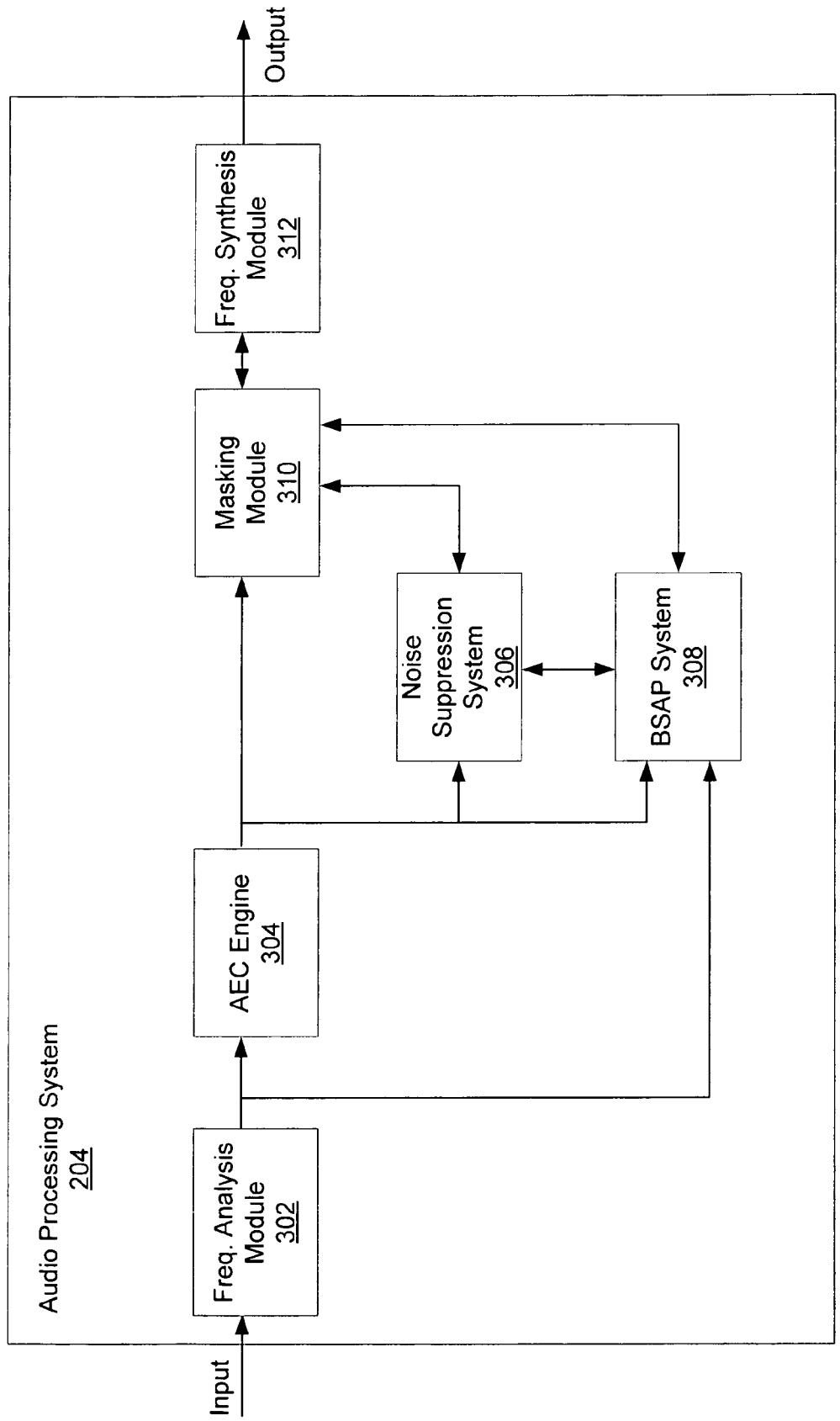
FIG. 3 is a block diagram of an exemplary audio processing system.

FIG. 3 is a detailed block diagram of the exemplary audio processing system 204, according to one embodiment of the present invention. In exemplary embodiments, the audio processing engine 204 is embodied within a memory device. The exemplary audio processing system 204 provides acoustic echo cancellation (AEC), noise suppression, and AEC post-filtering. As a result, an acoustic signal sent from the communication device 104 comprises noise suppression as well as reduced or eliminated echo from loudspeaker leakage.

In operation, the acoustic signals received from the primary and secondary microphones 106 and 108 are converted to electric signals and processed through a frequency analysis module 302. In one embodiment, the frequency analysis module 302 takes the acoustic signals and mimics the frequency analysis of the cochlea (i.e., cochlear domain) simulated by a filter bank. In one example, the frequency analysis module 302 separates the acoustic signals into frequency bands or subbands. Alternatively, other filters such as short-time Fourier transform (STFT), Fast Fourier Transform, Fast Cochlea transform, sub-band filter banks, modulated complex lapped transforms, cochlear models, a gamma-tone filter bank, wavelets, or any generalized spectral analysis filter/method, can be used for the frequency analysis and synthesis. Because most sounds (e.g., acoustic signals) are complex and comprise more than one frequency, a sub-band analysis on the acoustic signal may be performed to determine what individual frequencies are present in the acoustic signal during a frame (e.g., a predetermined period of time). According to one embodiment, the frame is 5-10 ms long. Alternative embodiments may utilize other frame lengths.

After frequency analysis, the signals are forwarded to an acoustic echo, cancellation (AEC) engine 304. In exemplary embodiments, the AEC engine 304 comprises a subtractive AEC engine 304. The AEC engine 304 is configured to reduce echo resulting from loudspeaker leakage back to the primary and secondary microphones 106 and 108. More details regarding the operation of the AEC engine 304 may be found in co-pending U.S. patent application Ser. No. 12/004,899 filed Dec. 21, 2007 and entitled "System and Method for 2-Channel and 3-Channel Acoustic Echo Cancellation," which is incorporated by reference.

The results of the AEC engine 304 may be provided to a noise suppression system 306 which incorporates AEC engine 304 results with noise suppression. More details on exemplary noise suppression systems 306 may be found in co-pending U.S. patent application Ser. No. 11/825,563 filed Jul. 6, 2007 and entitled "System and Method for Adaptive Intelligent Noise Suppression," U.S. patent application Ser. No. 11/343,524, filed Jan. 30, 2006 and entitled "System and Method for Utilizing Inter-Microphone Level Differences for Speech Enhancement," and U.S. patent application Ser. No. 11/699,732 filed Jan. 29, 2007 and entitled "System And Method For Utilizing Omni-Directional Microphones For Speech Enhancement," all of which are incorporated by reference.

In some embodiments, the results of the AEC engine 304 (i.e., AEC masked signal) may comprise residual echo. As such, exemplary embodiments utilize a blind subband AEC postfilter (BSAP) system 308 to process an output signal from the AEC engine 304. In exemplary embodiments, the BSAP system 308 is configured to calculate time and frequency varying gain values that will render residual echo from a subtractive AEC engine 304 inaudible. The operations of the noise suppression system 306 in combination with the BSAP system 308 will be discussed in more detail in connection with FIG. 4 below.

The results of the AEC engine 304, the noise suppression system 306, and the BSAP system 308 may then be combined in a masking module 310. Accordingly in exemplary embodiments, gain masks may be applied to an associated frequency band of the primary acoustic signal in the masking module 310.

Next, the post-AEC frequency bands are converted back into time domain from the cochlea domain. The conversion may comprise taking the post-AEC frequency bands and adding together phase shifted signals of the cochlea channels in a frequency synthesis module 312. Once conversion is completed, the synthesized acoustic signal may be output (e.g., forwarded to the communication network 114 and sent to the far-end environment 112).

It should be noted that the system architecture of the audio processing system 204 of FIG. 3 is exemplary. Alternative embodiments may comprise more components, fewer components, or equivalent components and still be within the scope of embodiments of the present invention.

Figure 4:
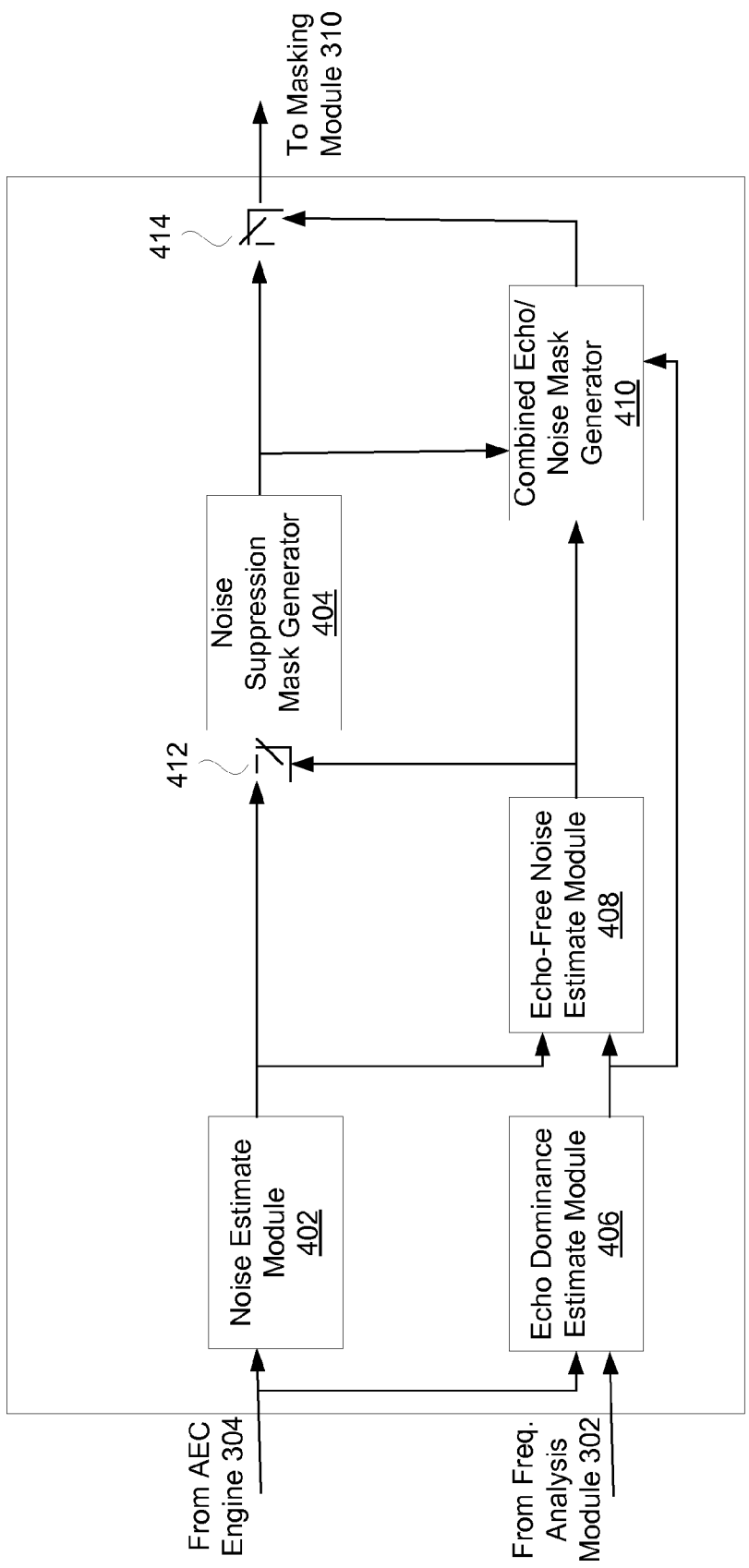
FIG. 4 is a block diagram of noise suppression and blind subband AEC postfiltering systems in operation.

Referring now to FIG. 4, a block diagram of the noise suppression system 306 and the BSAP system 308 in operation is shown. The noise suppression system 306 may comprise, at a minimum, a noise estimate module 402 and a noise suppression mask generator 404. Various embodiments of an exemplary noise suppression system 306, exemplary noise estimate module 402, and the exemplary noise suppression mask generator 404 are further discussed in U.S. patent application Ser. No. 11/825,563 filed Jul. 6, 2007 and entitled "System and Method for Adaptive Intelligent Noise Suppression."

The exemplary BSAP system 308 (also referred to herein as BSAP engine 308) is configured to determine gain values to apply to the results of the AEC engine 304 in order to render residual echo inaudible. In exemplary embodiments, these gain values may be less than 1 (e.g., less than 0 dB). That is, a multiplicative gain operation is applied for each subband. As such, at any given point in time, the BSAP engine 308 may multiply the acoustic signal in a subband by some number between 1 (i.e., no suppression) and 0 (i.e., complete suppression). In decibels, a gain close to 0 may be a very large negative dB gain. The BSAP system 308 may comprise an echo dominance estimate module 406, an echo-free noise estimate module 408, and a combined echo/noise mask generator 410.

In some embodiments, switches 412 and 414 may be provided. The switch 412 allows calculations from the BSAP engine 308 to be fed into the noise suppression mask generator 404 instead of results from the noise estimate module 402. As such an "echo-free" noise estimate is used by the noise suppression mask generator 404. The output is then provided to the combined echo/noise mask generator 410. However, if a BSAP engine 308 is not utilized, the switches 412 and 414 may be closed and the noise suppression mask generator 404 will utilize the results of the noise estimate module 402 and provide the noise suppression mask to the masking module 310. It should be noted that the use of these switches 412 and 414 allow embodiments of the present invention to be incorporated with any noise suppression system.

In operation, a strength of the BSAP engine 308 attenuation is desired to be proportional to a degree of dominance of the residual echo over other components of the acoustic signal (e.g., speech component) within a limit. In one embodiment, a measure of this dominance may be a ratio of an echo power to a power of all other near-end acoustic signal components (e.g., noise and speech components). This ratio may be defined as an echo to near-end signal ratio (ENR). Generally, a higher ENR indicates a more dominant and audible residual echo where a higher amount of attenuation is applied, whereas a lower ENR may indicate no applied attenuation is needed (e.g., because the residual echo is already inaudible).

The exemplary echo dominance estimate module 406 is configured to estimate the ENR in each frequency subband and time-frame. In exemplary embodiments, the echo dominance estimate module 406 compares inputs and outputs of the AEC engine 304 and attempts to exploit a relationship represented by $$ENR = \frac{\gamma - 1}{\beta - \gamma}, \qquad (1)$$

where $\gamma$ may be defined as a ratio of an input to output total power of the AEC engine 304, and $\beta$ may be defined as a ratio of an input to output echo power of the AEC engine 304.

In exemplary embodiments, $\gamma$ may be directly observed by the echo dominance estimate module 406 while $\beta$ may be estimated. That is, the echo dominance estimate module 406 may determine an average $\beta$. As a result, the ENR may be inferred from a measurement of $\gamma$. This echo dominance estimate may then be provided to the combined echo/noise mask generator 410.

In exemplary embodiments, the ENR may be estimated for each subband, as well as globally from a sum of all subbands for each time frame. This global dominance metric, $ENR_{glob}$, may be used in combination with frequency dependent ENR estimates by downstream modules (e.g., echo-free noise estimate module 408 and combined echo/noise mask generator 410) for robustness.

The output of the echo dominance estimate module 406 is also provided to the echo-free noise estimate module 408. The echo-free noise estimate module 408 is configured to compute an estimate of the near-end noise power spectrum (e.g., time and frequency dependent portion of the acoustic signal that is not from the acoustic source 102). In exemplary embodiments, the echo-free noise estimate module 408 refines the noise estimate received from the noise suppression system 306 (e.g., noise estimate module 402), which may be corrupted by echo power.

The results from the echo dominance estimate module 406 may then be used by the mask generator (e.g., noise suppression mask generator 404 and/or combined echo/noise mask generator 410) to determine how the echo may be masked by the noise 110. This information then allows the mask generator to limit an amount of suppression applied and reduce near-end signal distortion.

In some embodiments, the noise suppression system 306 may also benefit from using the echo-free noise estimate instead of the noise estimate from the noise estimate module 402 (e.g., when the noise suppression system 306 is designed to adapt to the noise 110 but not echo levels).

An exemplary method for preventing echo leakage into the noise estimate may be to freeze the noise power estimate when echo is strong. A determination of when to freeze may be based on the estimated ENR derived by the echo dominance estimate module 406. If the ENR in a subband is above a threshold, $ENR_{dom}$, then a noise power estimate in that subband may be frozen. Furthermore, if the $ENR_{glob}$ is above $ENR_{dom}$, then noise power estimates in all subbands may be frozen.

The exemplary combined echo/noise mask generator 410 is configured to generate an echo gain mask designed to render the residual echo inaudible. This echo gain mask may be combined with a noise suppression gain mask provided by the noise suppression system 306 to provide a final output gain mask for signal modification and reconstruction by the masking module 310. The echo gain mask may be produced, in one embodiment, by mapping an ENR-gain relationship through Equation (1) to describe the gain as a function of γ. For a Wiener filter, the relationship may be represented by $$G = \frac{\beta - \gamma}{\beta - 1}. \quad (2)$$

While these gains may be computed for each subband, a global gain value may also be derived from the estimated $ENR_{glob}$ via a global γ computed from a sum of subbands. In one embodiment, the echo gain mask in each subband may be derived by taking a minimum of the subband gain and the global gain.

The combined echo/noise mask generator 410 may also refine the echo gain mask in each subband to reduce near-end noise distortion. In one embodiment, the combined echo/noise mask generator 410 takes into account the near-end noise level (from the echo-free noise estimate) and the noise suppression gain mask. The echo gain mask may be limited such that a total output of power is not more than a certain amount (e.g., 6 dB) below an output noise power that may be produced by applying the noise suppression gain to the noise 110. This process may reduce perception of output noise modulation correlated with the echo, while still ensuring the echo remains inaudible.

The combined echo/noise mask generator 410 may then combine the noise suppression gain mask with the echo gain mask. In one embodiment, this combination may comprise selecting a minimum between the two gains (i.e., the noise suppression gain mask and the echo gain mask) in each subband.

Figure 5:
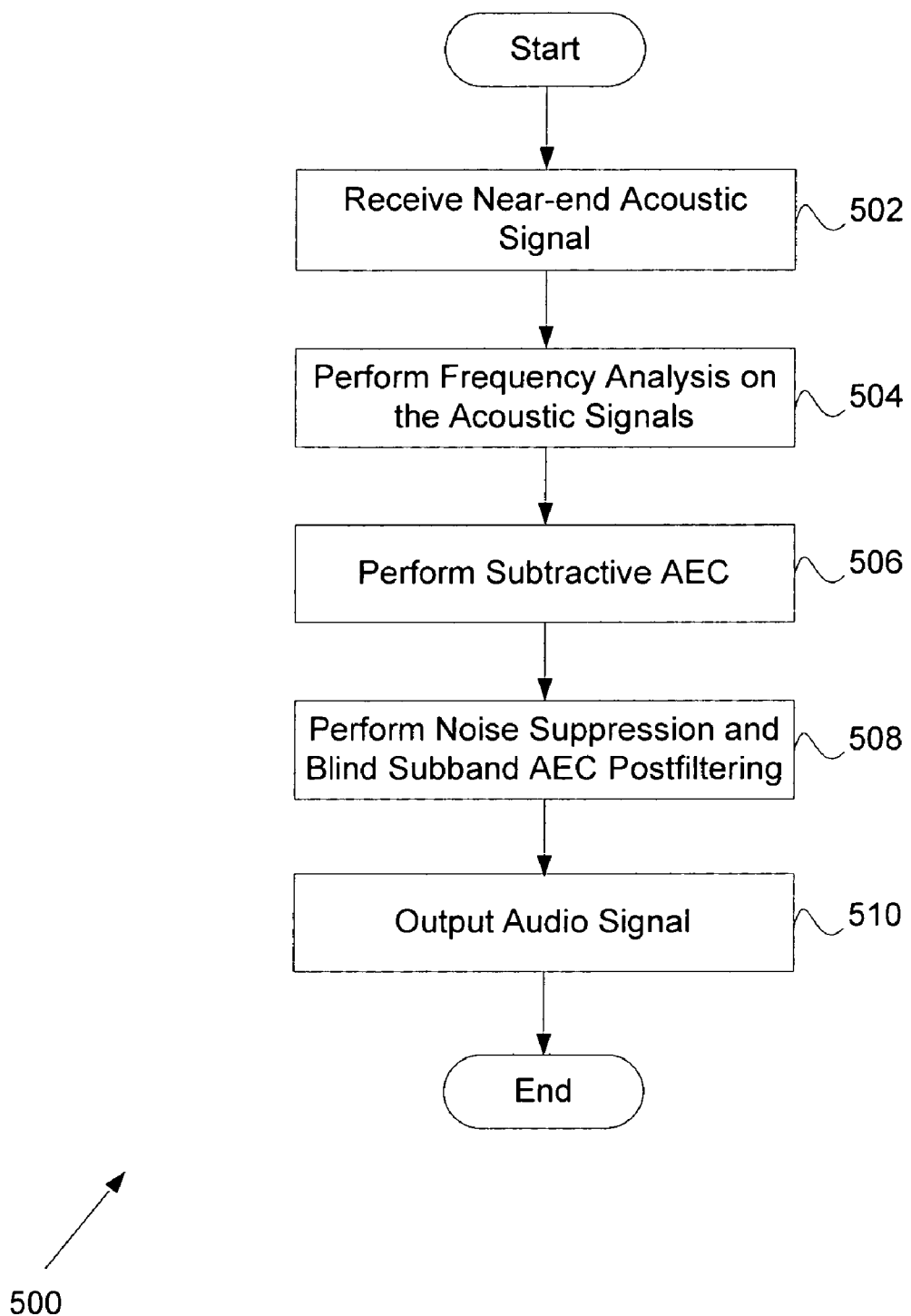
FIG. 5 is a flowchart of an exemplary method for blind subband acoustic echo cancellation and post AEC filtering.

Referring now to FIG. 5, a flowchart 500 of an exemplary method for providing blind subband AEC postfiltering (BSAP) is provided. In step 502, the acoustic signal from a near-end environment 100 are received by the communication device 104. In one embodiment, acoustic signals may be received by the primary and secondary microphones 106 and 108. If audio from the far-end environment 112 is being output through the loudspeaker 116, then audio from the loudspeaker 116 may leak back to the primary and secondary microphones 106 and 108. This may result in an echo being provided back to a listener at the far-end environment 112.

The acoustic signals are then converted to electric signals and processed through the frequency analysis module 302 to obtain frequency subbands in step 504. In one embodiment, a primary (microphone channel) acoustic signal and a secondary (microphone channel) acoustic signal may be analyzed by the frequency analysis module 302. In one embodiment, the frequency analysis module 302 takes the acoustic signals and mimics the frequency analysis of a cochlea (i.e., cochlear domain) simulated by a filter bank. The result comprises frequency subbands.

In step 506, subtractive AEC is performed on the acoustic signal. In accordance with one embodiment, a null coefficient may be determined for each subband. In some embodiments, this complex null coefficient may be continuously adapted to minimize residual echo. The null coefficient may then be applied to the secondary acoustic signal to generate a coefficient-modified acoustic signal. The coefficient-modified acoustic signal is then subtracted from the primary acoustic signal. The result comprises post-AEC frequency bands.

However, these post-AEC frequency bands may comprise residual echo. As such, noise suppression and BSAP may be performed in step 508. Step 508 will be discussed in more detail in connection with FIG. 6 below.

The resulting frequency bands may then be output in step 510. In accordance with exemplary embodiments, the resulting frequency bands are converted back into time domain from the cochlea domain. The conversion may comprise taking the resulting frequency bands and adding together phase shifted signals of the cochlea channels in the frequency synthesis module 312. Once conversion is completed, the synthesized acoustic signal may be output (e.g., forwarded to the communication network 114 and sent to the far-end environment 112).

Figure 6:
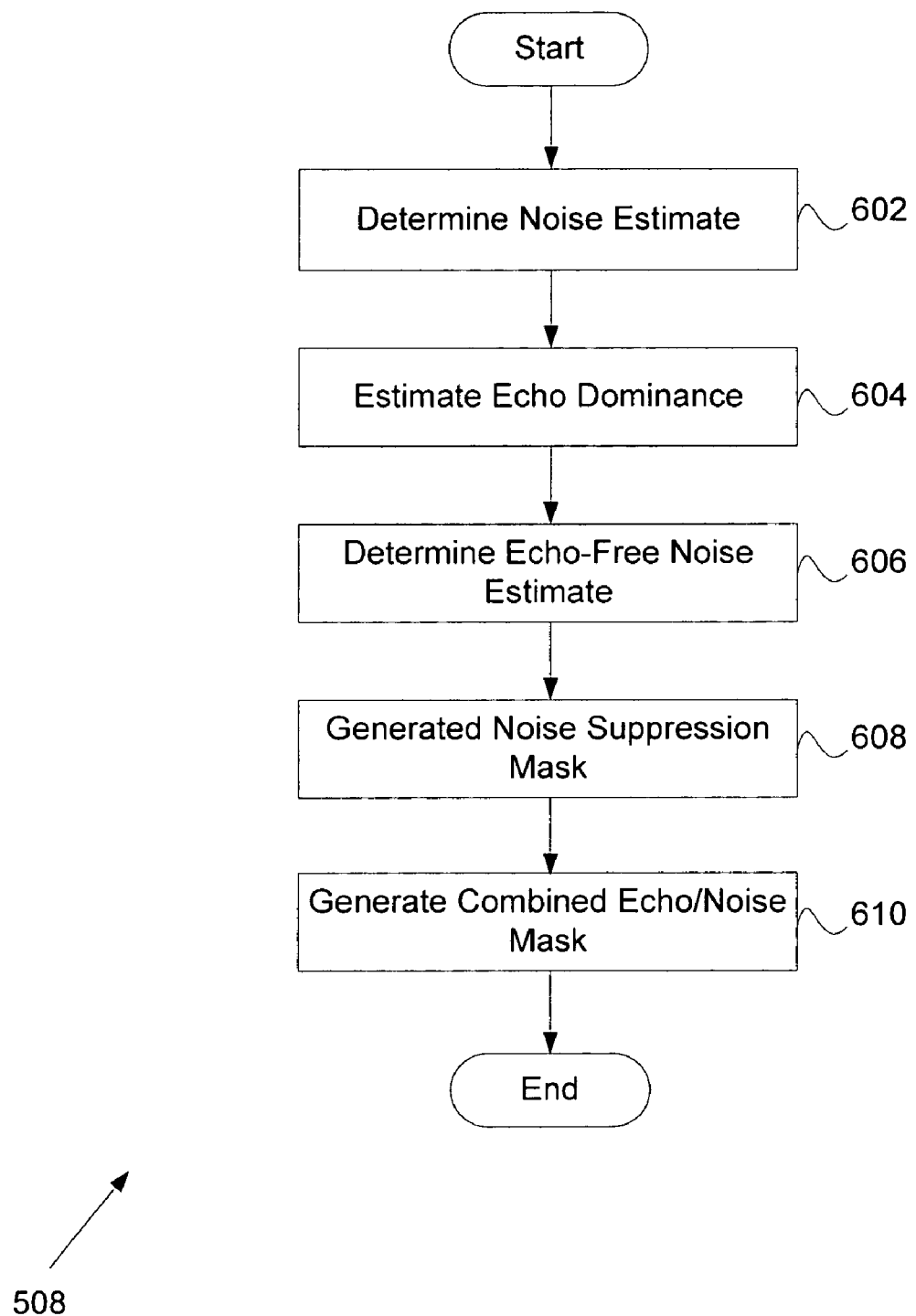
FIG. 6 is a flowchart of an exemplary method for performing noise suppression and blind subband AEC postfiltering.

Referring now to FIG. 6, a flowchart of the exemplary method for performing noise suppression and blind subband AEC postfiltering (i.e., step 508) is shown. In step 602, a noise estimate is determined. In exemplary embodiments, the noise estimate module 402 determines the noise estimate for each subband.

In step 604, the echo dominance estimate is calculated. In exemplary embodiments, the echo dominance estimate module 406 receives the inputs and outputs to the AEC engine 304. Using these inputs and outputs, a comparison is made to determine the echo to near-end signal ratio (ENR) for each frequency subband and time-frame.

An echo-free noise estimate is then determined in step 606. In exemplary embodiments, the echo-free noise estimate module 408 derives the echo-free noise estimate for each frequency subband. In exemplary embodiments, the echo-free noise estimate module 408 is configured to compute an estimate of the near-end noise power spectrum (e.g., time and frequency dependent portion of the acoustic signal that is not from the acoustic source 102). The echo-free noise estimate module 408 may refine the noise estimate received from the noise suppression system 306 (e.g., noise estimate module 402), which may be corrupted by echo power.

In step 608, a noise suppression mask may be generated. In exemplary embodiments, the echo-free noise estimate is provided to the noise suppression mask generator 404. Using the echo-free noise estimate, the noise suppression mask may be generated by the noise suppression mask generator 404.

In step 610, a combined echo/noise suppression mask is generated. In exemplary embodiments, the combined echo/noise suppression mask generator 410 generates the combined echo/noise suppression mask utilizing the echo dominance estimates, echo-free noise estimates, and noise suppression masks. This echo gain mask may be combined with a noise suppression gain mask provided by the noise suppression system 306 to provide a final output gain mask for signal modification and reconstruction by the masking module 310.

The above-described modules can be comprised of instructions that are stored on storage media. The instructions can be retrieved and executed by the processor 202. Some examples of instructions include software, program code, and firmware. Some examples of storage media comprise memory devices and integrated circuits. The instructions are operational when executed by the processor 202 to direct the processor 202 to operate in accordance with embodiments of the present invention. Those skilled in the art are familiar with instructions, processor(s), and storage media.

The present invention is described above with reference to exemplary embodiments. It will be apparent to those skilled in the art that various modifications may be made and other embodiments can be used without departing from the broader scope of the present invention. For example, embodiments of the present invention may be applied to any system (e.g., non speech enhancement system) utilizing AEC. Therefore, these and other variations upon the exemplary embodiments are intended to be covered by the present invention.

The invention claimed is:

1. A method for blind subband acoustic echo cancellation postfiltering in a communication device, comprising:
    receiving an acoustic signal via a microphone at a communication device;
    applying acoustic echo cancellation (AEC) to the acoustic signal to obtain an AEC masked signal;
    performing blind subband AEC postfiltering on the AEC masked signal to obtain an echo-free acoustic signal; and
    outputting the echo-free acoustic signal.

2. The method of claim 1 further comprising converting the echo-free acoustic signal into time domain for outputting.

3. The method of claim 1 further comprising performing frequency analysis on the acoustic signal to obtain frequency subbands for the acoustic signal.

4. The method of claim 1 wherein performing blind subband AEC postfiltering comprises determining a noise estimate for each subband of the acoustic signal.

5. The method of claim 1 wherein performing blind subband AEC postfiltering comprises determining an echo dominance estimate for each subband of the acoustic signal.

6. The method of claim 1 wherein performing blind subband AEC postfiltering comprises determining echo-free noise estimates for each subband of the acoustic signal.

7. The method of claim 1 wherein performing blind subband AEC postfiltering comprises generating a noise suppression mask.

8. The method of claim 7 wherein the noise suppression mask is generated based on echo-free noise estimates for each subband of the acoustic signal.

9. The method of claim 1 wherein performing blind subband AEC postfiltering comprises generating a combined echo/noise mask for each subband of the acoustic signal.

10. The method of claim 9 wherein performing blind subband AEC postfiltering comprises applying the combined echo/noise mask to each subband of the acoustic signal.

11. The method of claim 1 further comprising providing at least one switch, the at least one switch allowing implementation of blind subband AEC postfiltering with any noise suppression system.

12. A system for blind subband acoustic echo cancellation postfiltering in a communication device, comprising:
    an acoustic sensor configured to receive an acoustic signal;
    an acoustic echo cancellation (AEC) engine configured to reduce echo from the acoustic signal to obtain an AEC masked signal;
    a blind subband AEC postfiltering (BSAP) system configured to determine a blind subband AEC postfiltering gain for each subband of the AEC masked signal; and
    a masking module configured to apply the blind subband AEC postfiltering gain to each subband of the AEC masked signal to obtain an echo-free acoustic signal.

13. The system of claim 12 further comprising a frequency synthesis module configured to convert the echo-free acoustic signal into time domain for outputting.

14. The system of claim 12 further comprising a noise suppression system configured to reduce near-end noise from the acoustic signal.

15. The system of claim 12 wherein the BSAP system comprises an echo dominance estimate module configured to determine an echo dominance estimate for each subband of the acoustic signal.

16. The system of claim 12 wherein the BSAP system comprises an echo-free noise estimate module configured to determine an echo-free noise estimate for each subband of the acoustic signal.

17. The system of claim 12 wherein the BSAP system comprises a combined echo/noise mask generator configured to generate a combined echo/noise mask for each subband of the acoustic signal.

18. A machine readable medium having embodied thereon a program, the program providing instructions for a method for blind subband acoustic echo cancellation postfiltering in a communication device, comprising:
    receiving an acoustic signal via a microphone at a communication device;
    applying acoustic echo cancellation (AEC) to the acoustic signal to obtain an AEC masked signal;
    performing blind subband AEC postfiltering on the AEC masked signal to obtain an echo-free acoustic signal; and
    outputting the echo-free acoustic signal.

19. The machine readable medium of claim 18 wherein performing blind subband AEC postfiltering comprises determining an echo dominance estimate for each subband of the acoustic signal.

20. The machine readable medium of claim 18 wherein performing blind subband AEC postfiltering comprises determining echo-free noise estimates for each subband of the acoustic signal.

21. The machine readable medium of claim 18 wherein performing blind subband AEC postfiltering comprises generating a combined echo/noise mask for each subband of the acoustic signal.

* * * * *